(12) United States Patent
Mäkelä

(10) Patent No.: US 7,565,604 B2
(45) Date of Patent: Jul. 21, 2009

(54) METHOD AND A SYSTEM FOR DISPLAYING INFORMATION, AND A DEVICE

(75) Inventor: Mikko Mäkelä, Tampere (FI)

(73) Assignee: Nokia Corporation, Espoo (FI)

( * ) Notice: Subject to any disclaimer, the term of this patent is extended or adjusted under 35 U.S.C. 154(b) by 104 days.

(21) Appl. No.: 10/877,792

(22) Filed: Jun. 25, 2004

(65) Prior Publication Data

US 2004/0268248 A1   Dec. 30, 2004

(30) Foreign Application Priority Data

Jun. 27, 2003   (FI)   ................................... 20035112

(51) Int. Cl.
G06F 17/00 (2006.01)
(52) U.S. Cl. .................. 715/238; 715/243; 715/273; 715/246; 715/247
(58) Field of Classification Search .................. 715/513, 715/526, 517, 760, 788, 238, 243, 246, 247, 715/273
See application file for complete search history.

(56) References Cited

U.S. PATENT DOCUMENTS

| | | | |
|---|---|---|---|
| 6,185,589 B1 * | 2/2001 | Votipka | ....................... 715/517 |
| 6,300,947 B1 | 10/2001 | Kanevsky | |
| 6,556,217 B1 | 4/2003 | Mäkipää et al. | |
| 2003/0182628 A1 * | 9/2003 | Lira | ........................... 715/517 |

FOREIGN PATENT DOCUMENTS

| | | |
|---|---|---|
| EP | 1052598 | 11/2000 |
| EP | 1052598 A2 | 11/2000 |
| EP | 1162810 | 12/2001 |
| EP | 1162810 A2 | 12/2001 |
| WO | 0011850 | 3/2000 |
| WO | WO 00/11850 | 3/2000 |

OTHER PUBLICATIONS

Bickmore et al., "Web Page Filtering and Re-Authoring for Mobile Users", The Computer Journal, vol. 42, No. 6, 1999, 13 pages.*
"Web Page Filtering and Re-Authoring for Mobile Users", Bickmore et al., The Computer Journal, vol. 42, No. 6, 1999, 13 page document.

(Continued)

*Primary Examiner*—Stephen S. Hong
*Assistant Examiner*—Matthew J Ludwig
(74) *Attorney, Agent, or Firm*—Ware, Fressola, Van Der Sluys & Adolphson

(57) ABSTRACT

A method for displaying information in a device (1), which information is stored as a document with interpreting instructions for displaying the information. The interpreting instructions are interpreted, and on the basis of the interpretation, the information is converted to information to be displayed on the display of the device. In connection with the conversion of the document, it is examined if the document can be displayed without optimization on the display (2) of the device, wherein if, on the basis of the examination, it is detected that the displaying of the document requires optimization, the document is optimized; in other cases, the document is displayed in unoptimized format. The invention also relates to a system and a device (1) applying the method.

17 Claims, 4 Drawing Sheets

OTHER PUBLICATIONS

MozillaZine, Mozilla 1.3 Released (Mar. 13, 2003) http://www.mozillazine.org/talkback.html?article=2967.
Microsoft Internet Explorer 6 (2001) from Wikipedia http://en.wikipedia.org/wiki/Internet_Explorer.

Gilly, D. and O'Reilly & Associates, UNIX In a Nutshell, $2^{nd}$ ed. Chapters 12, 13 and 16 (Jun. 1992).

* cited by examiner

METHOD AND A SYSTEM FOR DISPLAYING INFORMATION, AND A DEVICE

CROSS-REFERENCE TO RELATED APPLICATIONS

This application claims priority under 35 USC §119 to Finnish Patent Application No. 20035112 filed on Jun. 27, 2003.

FIELD OF THE INVENTION

The present invention relates to a method for displaying information in a device, which information is stored as a document with interpreting instructions for displaying the information, wherein in the method, the interpreting instructions are interpreted and, on the basis of the interpretation, the information is converted to information to be presented on the display of the device. The invention also relates to a system for displaying information, which information is stored as a document with interpreting instructions for displaying the information, and which system comprises a device with a display, and interpreting means for interpreting the interpreting instructions and for converting the information, on the basis of the interpretation, to information to be presented on the display of the device. Furthermore, the invention relates to a device with a display for displaying information, which information is stored as a document with interpreting instructions for displaying the information, and the device comprises interpreting means for interpreting the interpreting instructions and for converting the information, on the basis of the interpretation, to information to be presented on the display of the device.

BACKGROUND OF THE INVENTION

Structural documentation languages have been developed in which certain interpreting instructions can be used to define how information contained in a document should be presented on the display of a device. Some structural documentation languages to be mentioned in this context include HTML (Hypertext Mark-up Language) and XHTML (Extensible HTML). A document complying with such a structural documentation language comprises, in addition to the actual information to be presented, interpreting instructions, by means of which a device processing the document can compose the desired information. The interpreting instructions may include information, for example, about the font, character size, colour, italizing, bolding, etc. to be applied when displaying a text. Furthermore, the interpreting instructions may contain information about the background colour, the margins, the layout of the text, the line division, etc. The document may also contain a reference (a hyperlink) to another document, wherein pointing at the reference will start the downloading of the reference document and displaying it on the device. Typically, the interpreting instructions of the above-presented kind are separated from the rest of the text with delimiters, such as angle brackets <, >. Thus, the device which processes the document can distinguish the interpreting instructions from other information and act accordingly.

The use of structural documentation languages has significantly increased as the use of the Internet data network has spread worldwide. Thus, a majority of documents in the Internet data network has been implemented with a structural documentation language, typically with said HTML. In the early days of using the Internet data network, the only way to access documents in the Internet data network was, in practice, to use a desktop computer (desktop PC). In such computers, the monitor is relatively large in size, normally at least 14 inches. This is one reason why most of the documents in the Internet data network have been designed to be displayed with such a display device. Recently, however, there has also been a significant increase in the use of portable devices to view documents in the Internet data network. For example, mobile stations have been developed which comprise facilities, such as a WAP browser, for access to the Internet data network. In mobile stations, however, the size of the display is significantly smaller than the display size in monitors for desktop computers. This means that it is difficult to view a document designed for a large-size monitor with a compact display device of a mobile station. For example, the browsing of wide pages requires the scrolling of the display in the width direction and in the vertical direction. In such a situation, it is difficult to piece together the text e.g. for the reason that the user of the mobile station only sees a small part of the text lines at a time. Another possibility to display a wide page is to display the text lines of the original document on several lines one below the other. Also in this case, it may be difficult to piece together the text. Furthermore, when a text is displayed in table format, the division of the table in lines and columns may be distorted, wherein it is difficult or even impossible to find out which information belongs to a given line and column. For example, time tables are typically drawn up in such a table form.

In some cases, the compiler of the document has provided such a version of the document which has been optimized for a small display, to be more applicable for displaying on e.g. a mobile station.

Also, arrangements have been developed, in which the browser program to be used for displaying the document optimizes the document to be more suitable for the display device of the device at the stage of downloading. Such a browser program can be installed in e.g. a mobile station with a facility for the downloading of documents from a data network and for displaying them on the display of the mobile station. One problem in such an arrangement is that after the optimization, the layout of the document may no longer be as definite as the original document. The optimizing algorithm may also change such parts in the document which would be clearly visible even without the optimization. In such a situation, the user may manually switch off the optimization. FIG. 1a shows an example of a document which is designed to be shown on small-size displays. In FIG. 1b, the example document of FIG. 1a has been optimized by an optimizing algorithm of prior art, wherein it is clearly visible that in this case, the optimization impairs the clarity of the document.

SUMMARY OF THE INVENTION

It is an aim of the present invention to provide an improved method for displaying documents particularly in devices in which the size of the display device is relatively small. The invention is based on the idea that when displaying the document, the device examines whether it is necessary to apply optimization or not. On the basis of this, the optimizing mode is turned on if a need for optimization is detected, or the optimizing mode is turned off if no need for optimization is detected.

According to a first aspect of the present invention there is provided a method for displaying information in a device, the method comprising:

storing information as a document with interpreting instructions for displaying the information;

interpreting the interpreting instructions;

converting, on the basis of the interpretation, the information to be displayed on the display of the device;

examining, in connection with the conversion of the document, if the document can be displayed without optimization on the display of the device, wherein if, on the basis of the examination, it is detected that the displaying of the document requires optimization, the method further comprises optimizing the document; in other cases, the method comprises displaying the document in an unoptimized format.

According to a second aspect of the present invention there is provided a system for displaying information, which information is stored as a document with interpreting instructions for displaying the information, and which system comprises:

a device with a display and interpreting means for interpreting the interpreting instructions and for converting the information, on the basis of the interpretation, to information to be displayed on the display;

examining means to examine if the document can be displayed without optimization on the display of the device; and optimizing means for optimizing the document, if, on the basis of the examination, it has been detected that the displaying of the document requires optimization.

According to a third aspect of the present invention there is provided a device with a display for displaying information, which information is stored as a document with interpreting instructions for displaying the information, and the device comprising:

interpreting means for interpreting the interpreting instructions and for converting the information, on the basis of the interpretation, to information to be displayed on the display;

examining means for examining if the document can be displayed without optimization on the display of the device; and optimizing means for optimizing the document, if, on the basis of the examination, it has been detected that the displaying of the document requires optimization.

According to a fourth aspect of the present invention there is provided a wireless communication device with a display for displaying information, which information is stored as a document with interpreting instructions for displaying the information, and the wireless communication device comprising:

interpreting means for interpreting the interpreting instructions and for converting the information, on the basis of the interpretation, to information to be displayed on the display;

examining means for examining if the document can be displayed without optimization on the display of the wireless communication device; and optimizing means for optimizing the document, if, on the basis of the examination, it has been detected that the displaying of the document requires optimization.

The present invention shows advantages over solutions of prior art. When applying the method according to the invention, optimization is automatically performed only when it is necessary. Thus, if the document to be downloaded in the device has been drawn up in a form suitable to be displayed, as such, on the device, optimization is unnecessary and is not performed. Moreover, the user of the device does not need to turn optimization on or off. This increases the convenience of the device in use. Also, the user sees the document in a form that is as suitable for the device as possible.

DESCRIPTION OF THE DRAWINGS

In the following, the invention will be described in more detail with reference to the appended drawings, in which.

DETAILED DESCRIPTION OF THE INVENTION

Figure 1B:
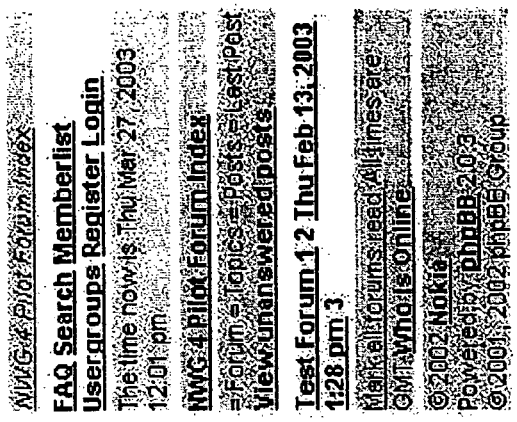
FIGS. 1a and 1b show an example document unoptimized and optimized by an algorithm of prior art.
Figure 1A:
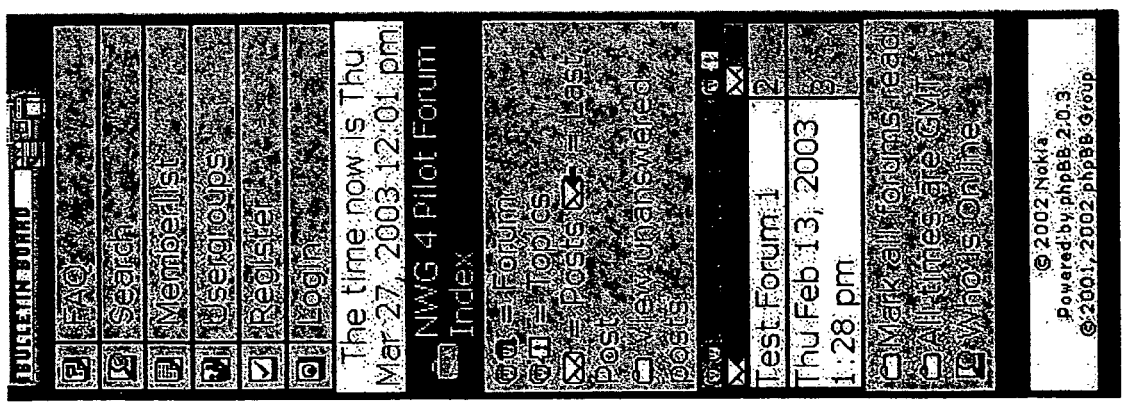
Figure 2:
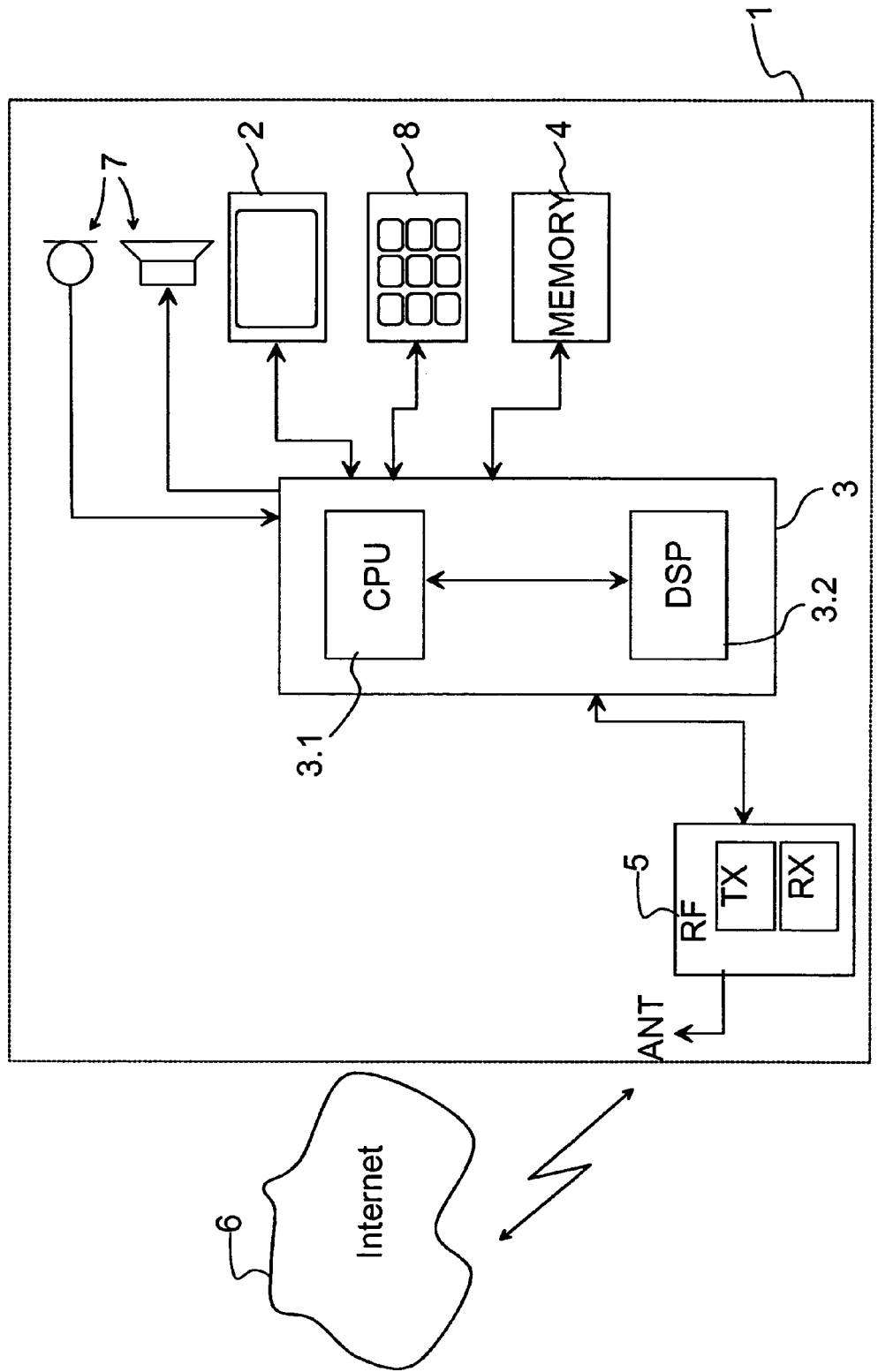
FIG. 2 shows a system and a device according to an example embodiment of the invention, in a reduced chart.

The invention can be applied in devices 1 with a display 2 for displaying information. FIG. 2 shows a non-restrictive example of such a device 1. The device of FIG. 2 is, for example, a mobile station, but the device may also be another device suitable for displaying information. The device 1 comprises a control block 3 for controlling the functions of the device 1. Preferably, the control block 3 comprises at least one processor 3.1, but it may also comprise other processors, such as a digital signal processing unit 3.2. The device 1 also comprises a memory 4 for storing e.g. software, the functional settings of the device 1, the optimization algorithm, and other data. The communication means 5 can be used, inter alia, for downloading documents e.g. from the Internet data network 6. However, the document to be processed does not necessarily need to be downloaded from a data network, but the document may also be stored in the memory 4 of the device, on a storage means, such as a CD-ROM, or the like. Preferably, the device 1 also comprises audio means 7, such as an earpiece/speaker and a microphone, as well as one or more keypads 8 for entering, for example, commands and data in the device 1.

Figure 4:
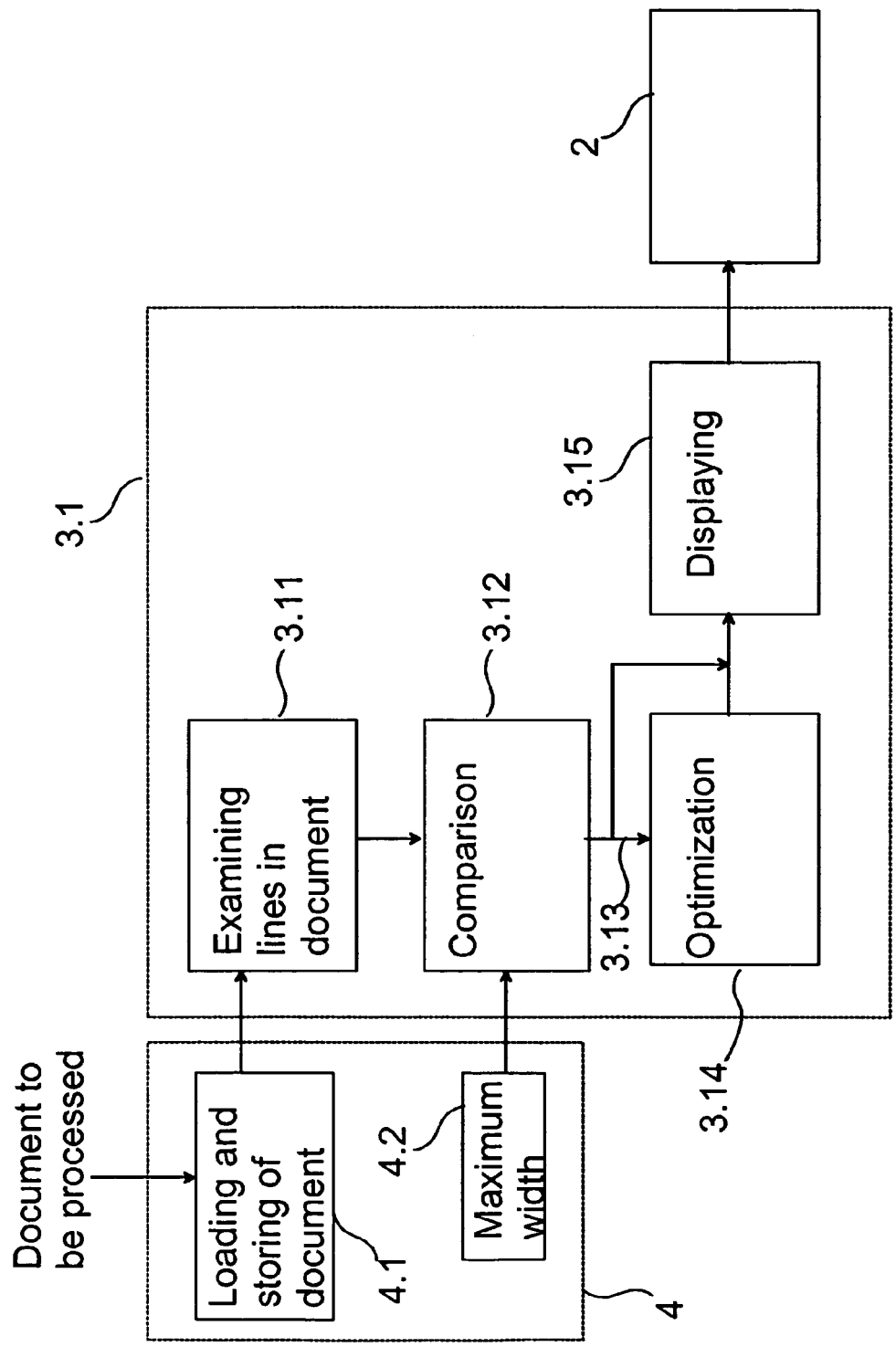
FIG. 4 shows, in a reduced manner, optimization means implemented in a device according to an advantageous embodiment of the invention.

In the following, the operation of the method according to an example embodiment of the invention in the system of FIG. 2 will be described with reference to an example of implementing the examining means, as shown in FIG. 4. In this context, it is assumed that the examining means are implemented primarily by software in the processor 3.1 of the device, but it is obvious that also other kinds of arrangements can be applied. The blocks 3.11-3.15 of the examining means 3.1 shown in FIG. 4 illustrate functions implemented by software, but they can also be implemented on the hardware level, for example, as separate circuits.

The user of the device 1 starts a browser application, or the like, in the device 1, for processing documents and for converting them to a format to be displayed on the display 2. The browser application is run in a way known as such, according to program commands of the browser program in the control block 3. The user uses a keypad 8, a pointer device (not shown) and/or the like, to define a document to be displayed on the display 2. The definition may be, for example, the name of the document and the address of the storage location, for example http:/www.domain.country/document.htm. After the document has been defined, the document is downloaded 4.1 in the device 1. If the document has been stored in the memory 4 of the device 1, the document can be transferred to a processing area in the memory 4, if necessary. For example, if the memory 4 comprises a Flash memory, a fixed disk or another permanent memory suitable for storing software, the program is copied to the memory area which is used as a processing memory, i.e. a random access memory, in the operation of the device 1. If the document is one stored in the Internet data network 6 or another data network, it is downloaded from the data network to the processing memory of the device 1 in a way known as such.

After the document has been loaded in the processing memory, the processing 3.11, 3.12 of the document is started. At this stage, the instructions for interpreting the document are examined. If, during the processing of the instructions for interpreting the document, it is detected that the document cannot be displayed sufficiently clearly on the display 2 of the device 1 without optimization, optimization is started (3.13). The criteria used for the clarity can be, for example, the width of the document, wherein optimization is performed 3.14 if the width of a line in the document exceeds the quantity of information fitting on the display in the width direction (the width of the display area). On the other hand, also in this case, some kind of an exceeding can be allowed, for example, in a situation in which only one line or a few lines exceed the width of the display area. After the processing of the whole document, or that part of the document which is to be displayed at a time (the size of the display area in the height direction), the document can be displayed 3.15. At the stage of displaying, optimization is performed, if a need for optimization was detected at the examining stage. In the optimization, e.g. the size of the text is changed and/or the text line is divided into several lines. However, in the optimization of information in table format, it should be taken into account that the layout of the columns remains as accurate as possible so that the information belonging to each column is clearly visible.

A document to be displayed without optimization can be converted to the display format, for example, by means of a display algorithm known as such, to process the instructions for interpreting the document. One such display algorithm is the automatic table layout algorithm.

Figures 3A, 3B:
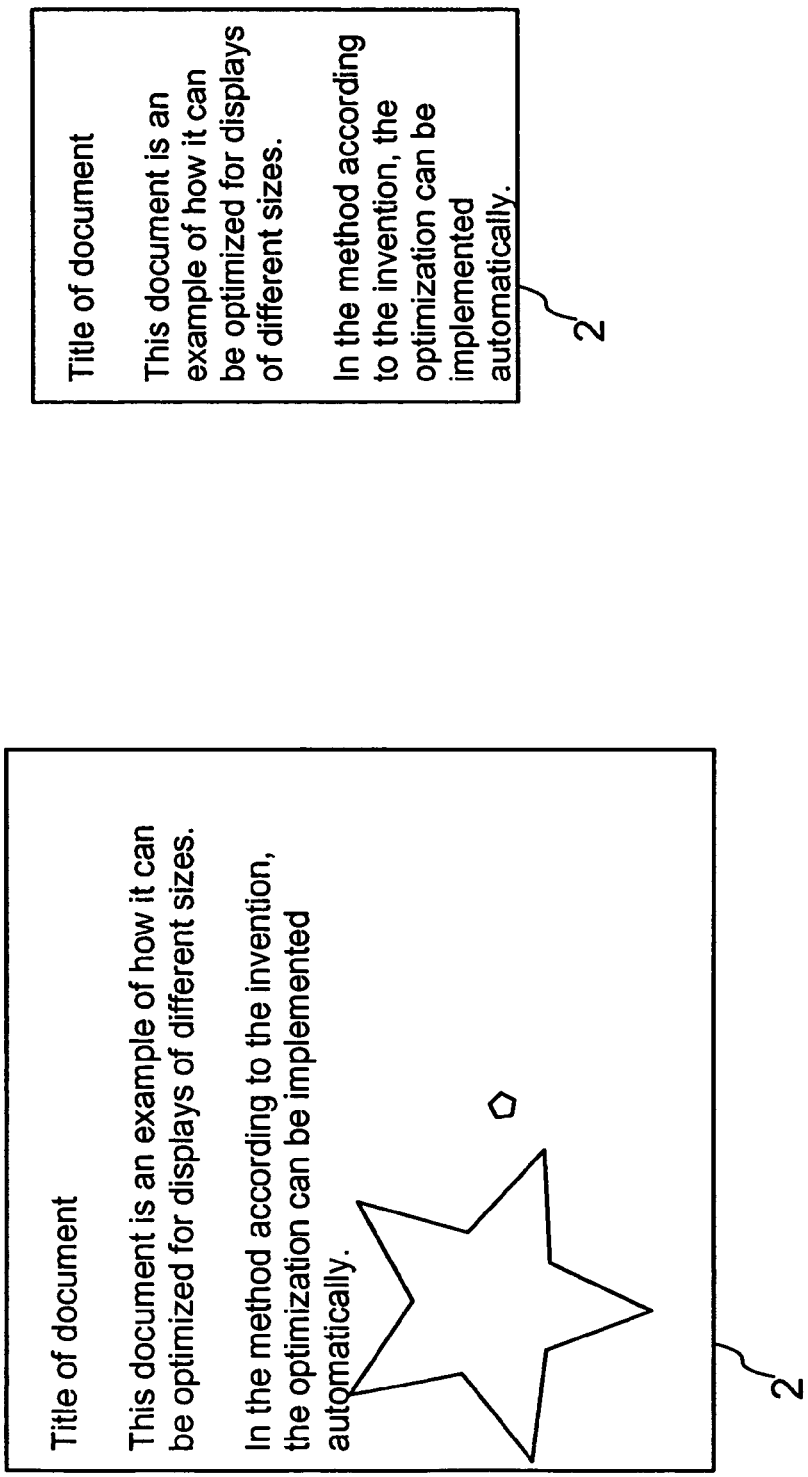
FIG. 3a shows another example document displayed on a large-size display.
FIG. 3b shows the document of FIG. 3a displayed on a small-size display and optimized according to an advantageous embodiment of the invention.

FIG. 3*a* shows an example of a document displayed on a large-size display 2. In FIG. 3*b*, the document of FIG. 3*a* is displayed on a small-size display 2, wherein the document has been, according to the invention, automatically optimized in connection with displaying the document.

We shall now describe the optimization algorithm to be used in the method according to an advantageous embodiment of the invention. The optimization algorithm has been designed for use in connection with XHTML documents, but the same principles may also be applied in connection with other structural documents.

In the displaying of the document, line division is allowed; that is, one line can be divided to be displayed on several lines.

Next, the processing proceeds to images and other elements in the document which may exceed the width of the display area. If the document contains such images and/or other elements whose height and/or width is below a given first limit value, such images and other elements are not displayed. An exception to this rule is link references, because for their part, the document only contains data about the reference of the link. The link reference is not displayed as such, wherein the character size used in the definition of the link reference is insignificant for the optimization. The link reference may comprise an image to be displayed as a symbol for the link reference. Such an image is displayed in spite of the optimization, even though the size of the image would be smaller than said first limit value. In XHTML documents, link references can be detected on the basis of the <a> identifier (element) and, correspondingly, the end of the link reference is indicated with the </a> identifier. Images with a width smaller than or equal to the second limit value and a height greater than or equal to the second limit value, are not displayed, unless they belong to a link reference definition. The width of images and other elements exceeding the width of the display area is set to the percentage value 100%. This means that in the displaying of the images, the width of that element is used, within which the image is to be displayed. The image is displayed so that its aspect ration is retained. Images higher than the height of the display area are scaled in the height direction to be substantially as high as the display area. Also in this situation, the aspect ratio of the image is preferably retained.

The size of the margins is limited to be smaller than or equal to the third limit value.

In the processing of tables, the following rules are observed in this example algorithm. Some of the defining elements of the table are left uninterpreted (unprocessed); that is, they are not used for editing the displaying of information. Those elements which are interpreted are, in this embodiment, the following: align, vertical align (valign), colour, background colour, font family, font size, font style, font variant, font weight, text align, text decoration, visibility, and line feed (br).

The width of table elements exceeding the width of the display area is set to the percentage value 100% or, in the case of a table of the highermost level, the width is set as the width of the display area.

Each line of the table is optimized preferably in the following way: an attempt is made to fit as many cells of the table as possible on one line. If all the cells of a line do not fit on the display in the width direction, the rest of the cells are displayed on a new line. To end such a new line, a new cell is formed whose properties correspond to the properties of the other cells on the line but such that the width of the cell is set as the free space left on the new line. In other words, the new cell is a kind of a null cell.

The above-mentioned null cell can also be used for such lines of the table which are narrower than the width of the display area. Consequently, the algorithm, in a way, forces each line of the table to fill the whole width of the display area. By this arrangement, it is possible to optimize the implementation of the algorithm and, to some extent, improve the function of the algorithm.

The width of the displays is determined on the basis of the content of the cells. The width of the text included in the cell is assumed to be the length of the longest text line in the cell, that is, the longest text part between two line feeds. If the height of a cell divided into lines is lower than the height of a preceding cell on the same line, this cell is left on said line.

In this context, it should also be mentioned that the optimization does not necessarily mean reducing the size of the information, but the optimization can also be made by enlarging (zooming) the original information, if the original information would only fill a part of the display.

A need for optimization may also occur in a situation in which the user enlarges the size of information to be displayed on the display 2, i.e. zooms the view to a larger size. In this case, the document which, in the basic format, would fit on the display in the width direction, does not necessarily fit on the display when enlarged. Optimization is thus performed by applying the above-presented principles.

In an advantageous embodiment of the invention, the user can still be given the option to select whether the optimization is on, off, or automatic, wherein the optimization is only implemented when necessary. This setting can be stored in a memory and be changed by the user, wherein the option selected by the user (optimization on/off/automatic) is observed in the documents displayed after changing the settings.

The optimization is not necessarily implemented in the device 1, but it can be implemented, for example, in the data network 6. In this case, the need for optimization is examined in the device 1. If the device 1 detects, when displaying the document, that optimization must be implemented and if the optimization has not been prevented by the user, the device 1 transmits a message, a program agent, setting data, data about the value of the optimization setting (on/off/automatic) or corresponding data to the data network 6, in which it is transferred to the server 6.1 processing the document. Preferably, the message also comprises data about the properties of the display 2 of the device 1, or if data about the properties of the devices has been stored in the data network 6, the message may thus comprise information about the identification of the device 1. On the basis of this information, the server searches for data relating to the display in the data of the properties of the device 1. When the properties of the display of the device 1 are known, the server 6.1 may optimize the document by applying the principles presented above. The optimized document is transmitted to the device 1, in which the document can be presented on the display 2.

If the device 1 cannot send the above-mentioned message, or the like, to the data network 6, e.g. automatic optimization can be used as a default value for optimization.

In yet another advantageous embodiment of the invention, the need for optimization can be examined in the data network 6 instead of the device 1. In this case, the device 1 does not need to transmit messages about the need for optimization to the data network.

Although the invention has been described above for implementing the optimization of pages, the invention is not limited to be used in such applications only. For example, in the browsing of large pages, a method can be applied, in which a large page is first displayed in a smaller size on the display. From this downsized page, the user can select an area. After the selection, e.g. the selected area is displayed in a larger size, or the whole document can be displayed and possibly optimized, wherein the information about the selected area is primarily used for displaying the selected area first. Consequently, in this latter alternative, the selected area is not necessarily enlarged but it is displayed, for example, in the centre of the display. If, after the selection, primarily the selected area is displayed only, it is possible, in small-size displays, to optimize the information contained in the selected area according to the present invention.

However, the centering area does not need to be displayed in connection with pages which have already been optimized to be suitable for small-size displays. Thus, the present invention can be applied by first checking if the original page, as such, fits on the display in the width direction or not. If it fits on the display in the width direction, no centering selection is prompted, but the page is displayed as such. In this case, the user does not need to make a selection. However, if the page does not fit on the display in the width direction, a centering selection is prompted for the user to select a desired part of the page. After the selection, the selected area is optimized and displayed on the display of the device.

The functions of the present invention can be primarily implemented by software as program commands in, for example, the device 1 and/or the server 6.1.

The present invention is not limited to the above-presented embodiments, but it can be modified within the scope of the appended claims.

What is claimed is:

1. A method comprising:
    receiving by a device information as a document with interpreting instructions for displaying the information;
    interpreting the interpreting instructions;
    converting, on the basis of the interpretation, the information to be displayed on a display;
    examining, in connection with the conversion of the document, if the document can be displayed without optimization on the display, wherein if, on the basis of the examination, it is detected that the displaying of the document requires optimization, the method further comprises optimizing the document; in other cases, the method comprises outputting the document in an unoptimized format;
    defining by the device a first limit value for a length of a first side of an image and a second limit value for a length of a second side of the image;
    determining a maximum length for information fitting on the display in the width direction; and
    comparing it with the quantity of information to be displayed of the document in the width direction;
    wherein if it is detected that the width of the information to be displayed exceeds said maximum length, optimization is implemented, and when the information causing the optimization is an image, the method further comprises:
    omitting displaying of the image when the length of the first side of the image is smaller than or equal to said first limit value, or when the width of the image is smaller than or equal to the second limit value and the height is greater than or equal to the second limit value, otherwise the method further comprises downsizing the image by maintaining the aspect ratio.

2. The method according to claim 1, wherein if the information causing the optimization is text, the method further comprises dividing a text line exceeding the maximum length into two or more lines.

3. The method according to claim 1, wherein the document used is a document based on hypertext markup language specifications.

4. The method according to claim 1, comprising selecting one of the following alternatives for implementing the optimization:
    the optimization is on, wherein the document is optimized at the stage of displaying,
    the optimization is off, wherein the document is not optimized at the stage of displaying, or
    the optimization is automatic, wherein the document is subjected to the optimization only when necessary.

5. The method according to claim 1, wherein when optimization is implemented a link reference comprises an image for display as a symbol for the link reference.

6. A device comprising:
    an input for inputting information as a document with interpreting instructions for displaying the information;
    an interpreter for interpreting the interpreting instructions and for converting the information, on the basis of the interpretation, to information to be displayed on a display;
    a processor configured to examine if the document can be displayed without optimization on the display;
    an optimizer for optimizing the document, if, on the basis of the examination, it has been detected that the displaying of the document requires optimization; and a downsizer for downsizing an image wherein the device comprises a first limit value for a length of a first side of the image, a second limit value for a length of a second side of the image, and the maximum length of information fitting on the display in the width direction has been defined, wherein the processor comprises a comparator for comparing the quantity of information of the document to be displayed, in the width direction, with said maximum length, for comparing the size of the image to said first limit value, and for comparing the width and the height of the image to the second limit value, and a transfer module for transferring the result of the comparison to the optimizer, and wherein the optimizer is configured to perform the optimization, if it is detected that the width of the information to be displayed exceeds said maximum length, and when the information causing the optimization is the image, the optimizer is configured to perform the optimization by omitting displaying of the image when the length of the first side of the image is smaller than or equal to said first limit value, or when the width of the image is smaller than or equal to the second limit value and the height is greater than or equal to the second limit value, and otherwise the downsizer is configured to downsize the image by maintaining the aspect ratio.

7. The device according to claim 6, wherein the device comprises the comparator and the optimizer.

8. The device according to claim 6, further comprising at least one data network and a communicator for transferring information between the data network and the device, wherein the device comprises the comparator, and the data network comprises the optimizer.

9. The device according to claim 6, also comprising at least one data network and a communicator for transferring information between the data network and the device, wherein the data network comprises the comparator and the optimizer.

10. The device according to claim 6, wherein the optimizer is configured to display a link reference comprising an image for display as a symbol for the link reference.

11. A device with a display for displaying information, which information is stored as a document with interpreting instructions for displaying the information, comprising:

an interpretor for interpreting the interpreting instructions and for converting the information, on the basis of the interpretation, to information to be displayed on the display;

a processor for examining if the document can be displayed without optimization on the display of the device;

an optimizer for optimizing the document, if, on the basis of the examination, it has been detected that the displaying of the document requires optimization;

a downsizer for downsizing an image;

a first limit value for a length of a first side of the image, a second limit value for a length of a second side of the image, and the maximum length of information fitting on the display in the width direction, wherein the processor comprises a comparator for comparing the quantity of information of the document to be displayed, in the width direction, with said maximum length, for comparing the size of the image to said first limit value, and for comparing the width and height of the image to the second limit value, and a transfer module for transferring the result of the comparison to the optimizer, and wherein the optimizer is configured to perform the optimization, if it is detected that the width of the information to be displayed exceeds said maximum length, and when the information causing the optimization is the image, the optimizer is configured to perform the optimization by omitting the displaying of the image when the length of the first side of the image is smaller than or equal to said first limit value, or when the width of the image is smaller than or equal to the second limit value and the height is greater than or equal to the second limit value, and otherwise the downsizer is configured to downsize the image by maintaining the aspect ratio.

12. The device according to claim 11, wherein the optimizer is configured to display a link reference comprising an image for display as a symbol for the link reference.

13. A device with a display for displaying information, which information is stored as a document with interpreting instructions for displaying the information, comprising:

means for interpreting the interpreting instructions and for converting the information, on the basis of the interpretation, to information to be displayed on the display;

means for examining if the document can be displayed without optimization on the display of the wireless communication device;

means for optimizing the document, if, on the basis of the examination, it has been detected that the displaying of the document requires optimization; and means for downsizing an image a first limit value for a length of a first side of an image, a second limit value for a length of a second side of the image, and the maximum length of information fitting on the display in the width direction, wherein the means for examining comprises means for comparing the quantity of information of the document to be displayed, in the width direction, with said maximum length, for comparing the size of the image to said first limit value, and for comparing the width and height of the image to the second limit value and means for transferring the result of the comparison to the means for optimizing the document, and wherein the means for optimizing the document are configured to perform the optimization, if it is detected that the width of the information to be displayed exceeds said maximum length, and when the information causing the optimization is the image, the means for optimizing are for performing the optimization by omitting displaying of the image if the length of the first side of the image is smaller than or equal to said first limit value, or when the width of the image is smaller than or equal to the second limit value and the height is greater than or equal to the second limit value, and otherwise the means for downsizing are for downsizing the image by maintaining the aspect ratio.

14. The device according to claim 13, wherein the means for optimizing are for displaying a link reference comprising an image for display as a symbol for the link reference.

15. A computer program product comprising a computer readable storage structure embodying computer program code thereon for execution by a computer processor, wherein said computer program code comprises instructions for performing a method comprising:

receiving information as a document with interpreting instructions for displaying the information;

interpreting the interpreting instructions;

converting, on the basis of the interpretation, the information to be displayed on the display of the device;

examining, in connection with the conversion of the document, if the document can be displayed without optimization on the display of the device, wherein if, on the basis of the examination, it is detected that the displaying of the document requires optimization, the method further comprises optimizing the document; in other cases, the method comprises displaying the document in an unoptimized format;

defining a first limit value for a length of a first side of an image and a second limit value for a length of a second side of the image;

determining a maximum length for information fitting on the display in the width direction; and comparing it with the quantity of information to be displayed of the document in the width direction;

wherein if it is detected that the width of the information to be displayed exceeds said maximum length, optimization is implemented, and when the information causing the optimization is an image, the method further comprises:

omitting displaying of the image when the length of the first side of the image is smaller than or equal to said first limit value, or when the width of the image is smaller than or equal to the second limit value and the height is greater than or equal to the second limit value, otherwise the method further comprises downsizing the image by maintaining the aspect ratio.

16. A method comprising:

receiving by a device information as a document with interpreting instructions for displaying the information;

interpreting the interpreting instructions;

converting, on the basis of the interpretation, the information to be displayed on a display;

examining, in connection with the conversion of the document, if the document can be displayed without optimization on the display, wherein if, on the basis of the examination, it is detected that the displaying of the document requires optimization, the method further comprises optimizing the document; in other cases, the method comprises outputting the document in an unoptimized format;

receiving a first limit value for a length of a first side of an image and a second limit value for a length of a second side of the image;

determining a maximum length for information fitting on the display in the width direction; and comparing it with the quantity of information to be displayed of the document in the width direction;

wherein if it is detected that the width of the information to be displayed exceeds said maximum length, optimization is implemented, and when the information causing the optimization is an image, the method further comprises:

omitting displaying of the image when the length of the first side of the image is smaller than or equal to said first limit value, or when the width of the image is smaller than or equal to the second limit value and the height is greater than or equal to the second limit value, otherwise the method further comprises downsizing the image by maintaining the aspect ratio.

17. A device comprising:

an input for inputting information as a document with interpreting instructions for displaying the information;

an interpreter for interpreting the interpreting instructions and for converting the information, on the basis of the interpretation, to information to be displayed on a display;

a processor configured to examine if the document can be displayed without optimization on the display;

an optimizer for optimizing the document, if, on the basis of the examination, it has been detected that the displaying of the document requires optimization;

a downsizer for downsizing an image; and an input for inputting a first limit value for a length of a first side of the image, a second limit value for a length of a second side of the image, and the maximum length of information fitting on the display in the width direction, wherein the processor comprises a comparator for comparing the quantity of information of the document to be displayed, in the width direction, with said maximum length, for comparing the size of the image to said first limit value, and for comparing the width and the height of the image to the second limit value, and a transfer module for transferring the result of the comparison to the optimizer, and wherein the optimizer is configured to perform the optimization, if it is detected that the width of the information to be displayed exceeds said maximum length, and when the information causing the optimization is the image, the optimizer is configured to perform the optimization by omitting displaying of the image when the length of the first side of the image is smaller than or equal to said first limit value, or when the width of the image is smaller than or equal to the second limit value and the height is greater than or equal to the second limit value, and otherwise the downsizer is configured to downsize the image by maintaining the aspect ratio.

* * * * *